United States Patent [19]
Shaffer et al.

[11] 3,781,481
[45] Dec. 25, 1973

[54] AMPLIFIER SELECT AND CONTROL CIRCUIT

[75] Inventors: William E. Shaffer; Charles C. Krawczyk, both of Rochester, N.Y.

[73] Assignee: Stromberg-Carlson Corporation, Rochester, N.Y.

[22] Filed: Sept. 30, 1971

[21] Appl. No.: 185,228

[52] U.S. Cl. .......... 179/16 F, 179/170 R
[51] Int. Cl. .......... H04b 3/36
[58] Field of Search .......... 179/16 E, 16 EA, 179/16 F, 170 R, 170.2, 170.6, 170.8, 18 GD

[56] References Cited

UNITED STATES PATENTS

| | | | |
|---|---|---|---|
| 3,689,711 | 9/1972 | Earle et al. | 179/170.6 |
| 3,689,704 | 9/1972 | Wadding | 179/16 F |
| 3,083,265 | 3/1963 | Paulaitis et al. | 179/170 R |
| 3,671,676 | 6/1972 | Henry et al. | 179/16 F |
| 3,493,686 | 2/1970 | Spittler et al. | 179/16 F |
| 3,483,336 | 12/1969 | Lent | 179/170.2 |
| 3,465,104 | 9/1969 | Zebe | 179/16 F |
| 3,339,027 | 8/1967 | Feiner et al. | 179/16 F |

OTHER PUBLICATIONS

F. T. Andrews, Jr., "Customer Lines Go Electronic," Bell Labs Record, Vol. 50, No. 2, February 1972, pages 59–65.

*Primary Examiner*—William C. Cooper
*Assistant Examiner*—Randall P. Myers
*Attorney*—Charles C. Krawczyk et al.

[57] ABSTRACT

The disclosed amplifier select and control circuit provides a means for connecting an amplifier in a telephone connection as required to compensate for the loss of voice signals because of attenuation in the system. The amplifier select and control circuit comprises a current limiting circuit for the direct current flow in the telephone connection and a detector circuit to provide a signal that is a function of the resistance of the connected telephone line. When the resistance is above a preset level, an amplifier or repeater is connected into the connection. An additional feature is the provision of an automatic gain arrangement to vary the gain of the amplifier or repeater as a function of the resistance of the line.

12 Claims, 9 Drawing Figures

WILLIAM E. SHAFFER
CHARLES C. KRAWCZYK
*INVENTORS*

BY Donald M. Winegar

ATTORNEY

PATENTED DEC 25 1973

3,781,481

SHEET 2 OF 7

WILLIAM E. SHAFFER
CHARLES C. KRAWCZYK
*INVENTORS*

BY Donald M. Winegar

ATTORNEY

WILLIAM E. SHAFFER
CHARLES C. KRAWCZYK
*INVENTORS*

BY Donald M. Winegar

ATTORNEY

WILLIAM E. SHAFFER
CHARLES C. KRAWCZYK
*INVENTORS*

BY Donald M. Winegar

ATTORNEY

WILLIAM E. SHAFFER
CHARLES C. KRAWCZYK
*INVENTORS*

BY Donald M. Winegar

ATTORNEY

PATENTED DEC 25 1973

3,781,481

SHEET 6 OF 7

WILLIAM E. SHAFFER
CHARLES C. KRAWCZYK
INVENTORS

BY Donald M. Winegar

ATTORNEY

WILLIAM E. SHAFFER
CHARLES C. KRAWCZYK
INVENTORS

BY Donald M. Winegar
ATTORNEY

AMPLIFIER SELECT AND CONTROL CIRCUIT

BACKGROUND OF THE INVENTION

This invention pertains to an arrangement for controlling the gain in telephone connections, and more particularly, for selectively connecting amplifiers and/or controlling the gain of amplifiers connected into telephone connections involving long line connections.

Telephone sets located on the subscriber premises are connected to a central office by two metallic conductors, generally called a telephone line. Such telephone lines vary in length depending upon the distance between the subscriber premises and the central office. The resistance of the line increases as the length of the telephone line increases. Furthermore, due to the high cost of copper, there is a general tendency to use smaller diameter conductors to reduce cost, resulting in a higher resistance per unit length. Hence, with smaller diameter wires, the length of the telephone lines becomes an increasingly important factor in determining the signal attenuation in telephone lines. If the resistance of the line exceeds approximately 1,500 ohms (generally considered a long line), provisions should be made in the central office to assure the high resistance of the long telephone line does not affect the proper operation of the telephone set and the connections thereto.

The proper operation of a long line subscriber telephone connection necessitates at least two requirements. One requirement is that sufficient battery potential must be provided to the telephone set to assure proper operation of the receiver and transmitter. A second requirement is that adequate means must be provided to replace the audio frequency energy lost due to line attenuation. Equipment suitable for meeting these two requirements could be provided on an individual long line basis, but this method is expensive and requires additional space in associated telephone equipment. Equipment suitable for meeting these two requirements could also be provided on a per group of telephone lines basis, often called common mode operation. This proves undesirable since this approach restricts the connection of long telephone lines to particular line groups.

Amplifiers, such as repeaters, should not be indiscriminately connected into long line and short line connections. If amplifiers are connected into short line connections, the amplifiers may break into oscillation or cause undesirable echo effects. Therefore, if amplifiers are to be provided for circuits that can be connected to long and short lines, then apparatus is required to determine whether the connections are long line connections, and then provide for the selective insertion of amplifiers into the connection. In addition to the foregoing, if amplifiers are required to be connected into both long and short line connections, then means are required to automatically adjust the operation of the amplifiers to assure no oscillation or echo problems occur. In addition, it would be beneficial if some sort of gain control can be provided for amplifiers selectively connected to long line connections to assure adequate amplification over the expectant range of attenuation due to different lengths of long telephone lines.

It is, therefore, an object of this invention to provide a new and improved telephone circuit for detecting a long line connection and connecting an amplifier thereto.

It is also an object of this invention to provide a new and improved telephone circuit to provide a current limiting arrangement to control the current flow to long and short line connections and to detect the presence of a long line connection for connecting an amplifier circuit thereto.

It is a still further object of this invention to provide a new and improved telephone circuit for monitoring the resistance of a telephone line connected to a telephone exchange for connecting amplifiers into long line connections and for applying a signal for automatically controlling the gain of the amplifier circuit.

It is also an object of this invention to provide a telephone circuit for monitoring the resistance of a telephone line connection for applying an automatic gain control signal to an amplifier for adjusting the operation of the amplifier as a function of the resistance of the line connected thereto.

BRIEF DESCRIPTION OF THE INVENTION

The invention provides an amplifier circuit control arrangement for allowing common equipment to be used for long and short line type connections and still provide amplifier gain capability to make up for losses due to attenuations in the connection.

In accordance to one embodiment of the invention, circuit means are provided for detecting when the resistance of a telephone connection exceeds a preset limit and to connect an amplifier or repeater circuit into the telephone connection.

A further feature of the invention includes an arrangement for monitoring the resistance of the telephone line when the connection is initially completed to connect the amplifier or repeater into the connection (if the resistance is above the preset limit) and to "lock in" the amplifier or repeater for the duration of the call, thereby rendering the connection insensitive to dial pulses and hook flashes.

Another feature of the invention includes a current limiting circuit for limiting the amount of current applied to low resistance connections (short lines) and still provide sufficient current for high resistance connections (long lines).

A still further feature of the invention provides for means which provides an automatic gain control signal to an amplifier or repeater connected into a telephone connection to adjust the gain thereof as a function of the resistance of the connection thereby providing further control over the transmission of the voice signal via the high resistance (long line) connections. The automatic gain control can include a memory arrangement to provide an automatic gain control signal that is a function of the resistance of the connection at the time it was initially established and thereby rendering the gain control of the amplifier or repeater insensitive to dialing and hook flash signals, and in the case of certain step-by-step systems, provides a continuous automatic gain control signal in the first selector circuit even though the resistance sensing portion of the invention in the first selector circuit is subsequently disconnected.

A further embodiment of the invention includes an arrangement wherein an amplifier or repeater is permanently connected into the circuit for both long and short line connections, however, with automatic gain control arrangements controlling the gain of the amplifier or repeater circuit as a function of the resistance of the line to eliminate instabilities when connecting a repeater to both long and short line connections.

DESCRIPTION OF THE PREFERRED EMBODIMENT

Figure 1:
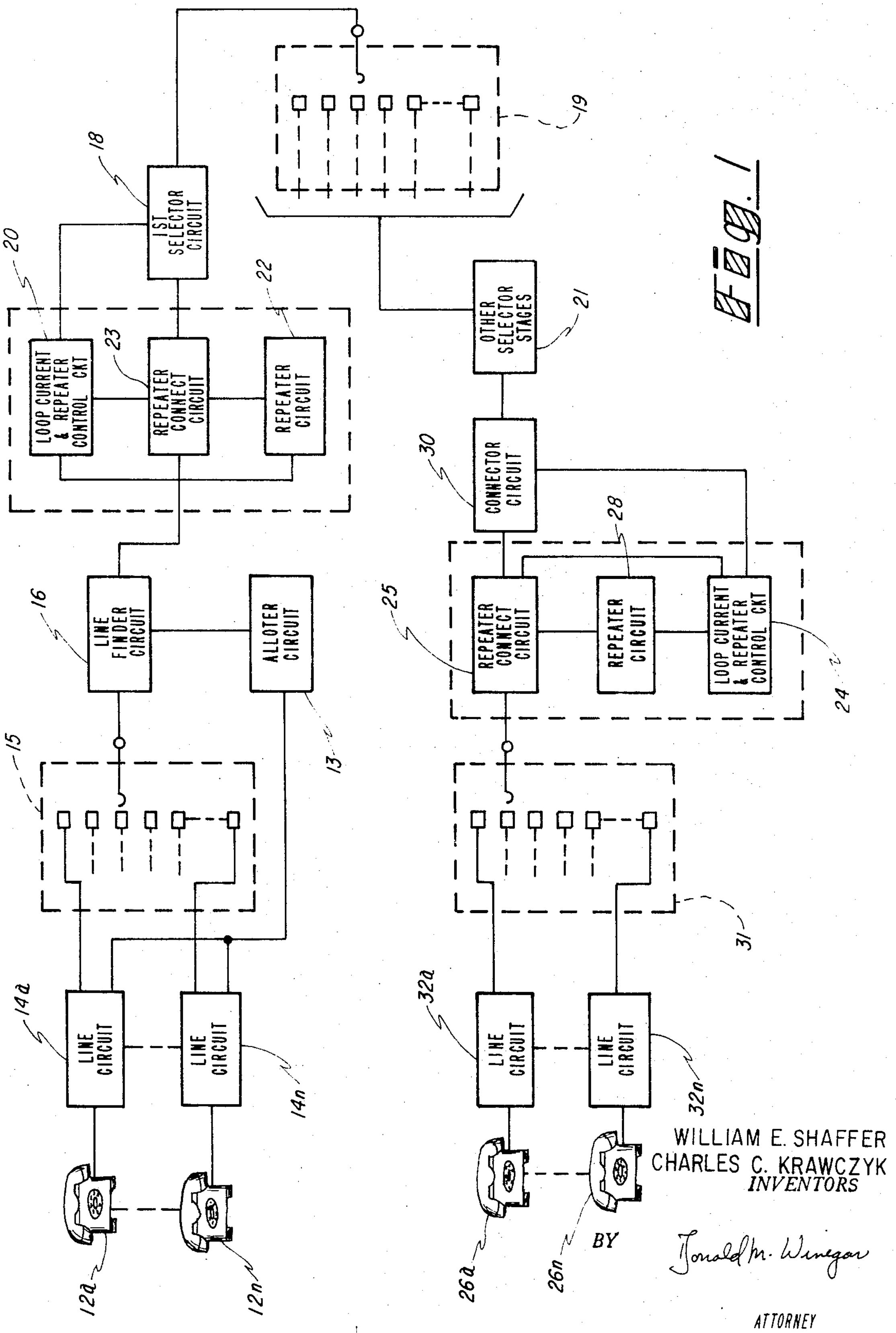
FIG. 1 is a block diagram of a step-by-step telephone system including the amplifier select and control circuit of the invention.

FIG. 1 illustrates a step-by-step telephone switching system that has been modified to include an amplifier select and control circuit for selectively inserting an amplifier or repeater (a particular type of a bidirectional amplifier) into connections in accordance with the teachings of the invention. The arrangement of FIG. 1 illustrates the components required to complete a connection in a step-by-step office between any one of a plurality of calling telephone sets **12*a*–12*n* to any one of a plurality of called telephone sets 26*a*–26*n*. The telephone sets 12*a*–12*n* and 26*a*–26*n*, are connected to a separate one of the line circuits 14*a*–14*n* and 32*a*–32*n*, respectively. The telephone system includes the usual line finder circuit 16 connected through the line finder switch 15 for locating an off hook connection. An allotter circuit 13 selects the line finder circuit 16 to be used with each call. In response to the dial pulses, the first selector circuit 18 and its switch 19, the connector circuit 30 and its switch 31, and any other intermediate selector stages 21 employed in this system, establish a connection between the calling party and the called party. In addition to the foregoing, it is to be understood that if one of the telephone sets 26*a*–26*n* is to be the calling party and one of the telephone sets 12*a*–12*n* is to be the called party, the connection could be illustrated by merely substituting the telephone sets 26*a*–26*n* and its line circuits for the telephone sets 12*a*–12*n*** and their line circuits. The step-by-step system of the type illustrated is well known in the art and requires no further explanation. Furthermore, the step-by-step system is used as exemplary means for illustrating the use of the detector circuit and its connection as an amplifier repeater control circuit in accordance with the teachings of this invention, and it should be understood that the invention can also be employed in other types of telephone systems, such as common control systems, as will be discussed in detail in a later portion of the specification.

In order to initially describe the invention more particularly, the telephone system of FIG. 1 embodying the invention will be described as having repeaters selectively connected therein. In later embodiments of the invention, selective connection of amplifiers will be described. In accordance with one embodiment of the invention, a loop current and repeater control circuit 20 is connected to the first selector circuit 18. The loop current and repeater control circuit 20 functions to determine if the telephone set (**12*a*–12*n*) selected by the line finder circuit 16 via switch 15 is a long line, and if it is a long line, enables a repeater connect circuit 23 to switch a repeater circuit 22 into the circuit for amplifying voice signals. The loop current and repeater control circuit 20 also provides a current limiting control function to maintain the line current below a preset level for long and short telephone line connections and, in addition, provides a signal that can function as an automatic gain control (AGC) signal for the repeater 22. The repeater connect circuit 23 is enabled for a short period of time, corresponding to the time period less than that required for a telephone to go off hook and the dialing of the first dial signal, and is disabled thereafter. Hence, the repeater connect circuit 23, in response to a long calling line 12*a*–12*n*, "seals in" or "locks in" the repeater circuit 22** into the connection before the first dial signal occurs.

In accordance with the further embodiment of the invention, a loop current and repeater control circuit 24 is connected to the connector circuit 30. The loop current and repeater control circuit 24 controls a repeater connect circuit 25 to switch a repeater circuit 28 into the connection if the called party (**26*a*–26*n*) is a long line. The loop current and repeater control circuit 24 also provides the current limiting and AGC functions. When a long line called party (26*a*–26*n*) goes off hook, the repeater connect circuit 25 is enabled for a short period of time to lock the repeater circuit 28** into the connection.

Hence, as can be seen from the arrangement illustrated in FIG. 1, repeater circuits 22 and 28 can be provided on a per line finder and per connector circuit basis, and can be selectively inserted into a telephone connection depending upon the length (resistance) of the telephone connections involved. If the calling party (**12*a*–12*n*) is a long line connection, the repeater 22 will be inserted into the connection. If the called party (26*a*–26*n*) is a long line connection, then the repeater 28** is inserted into the connection. If both parties are long line connections, both repeaters are inserted into the connection.

Figure 2:
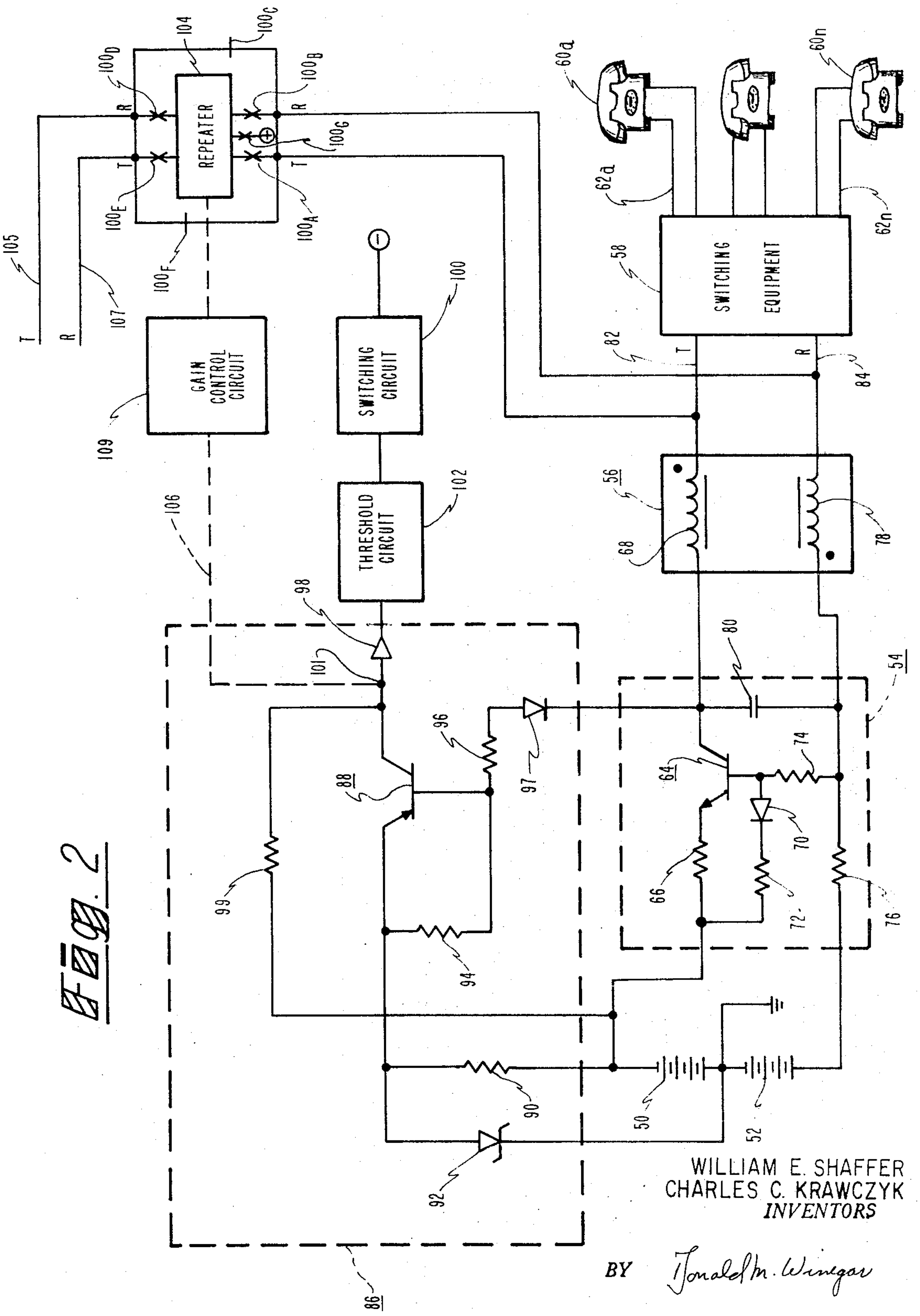
FIG. 2 is a schematic diagram of a current limiter circuit and detector circuit for connecting a repeater or amplifier circuit into the connection in accordance with the teachings of this invention.

Referring now to FIG. 2, the power supply for the telephone connection is supplied by a pair of batteries 50 and 52 connected in series. The loop current and repeater control circuit 20 includes a current limiting circuit 54 and a detector circuit 86. The batteries are connected through the current limiting circuit 54, and a dual coil relay 56 and for connection through the switching equipment 58 to any one of a plurality of telephones (**60*a*–60*n***) via the corresponding telephone lines (62a–62n). Where the loop current and repeater control circuit is connected to the first selector circuit 18 (FIG. 1), the relay 56 is the calling battery relay (CB) and when connected to the connector circuit 30 (FIG. 1), the answer battery relay (AB). The current limiting circuit includes a transistor 64 having its emitter connected through a resistor 66 to the negative terminal of the battery 50 and its collector connected to one end of the relay coil 68. The base of the transistor 64 is connected through a diode 70 and a resistor 72 to the negative terminal of the battery 50 and also through resistors 74 and 76 to the positive terminal of the battery 52. The positive terminal of the battery 50 and a negative terminal of the battery 52 are grounded. The junction of the resistors 74 and 76 is connected to one end of the other relay coil 78. The other ends of the relay coils 68 and 78 are connected to the switching equipment 58. A capacitor 80 is connected between the collector of the transistor 64 and the junction of the resistors 74 and 68.

The circuit 54 functions as a current limiting circuit that controls the current flow in the telephone connection depending upon the length (resistance) of the telephone line 62a–62n connected to the circuit 54 by the switching equipment 58. The circuit 54 allows the use of a higher potential power supply at the central office to assure that sufficient current is available for properly energizing telephone connections via long line connections and also limits the current provided by the power source to desirable operating limits when connected to short line connections. In effect, when one of the telephone sets (60a–60n) is connected across the relay 56 by the switching equipment 58, a direct current load is applied across the lines 82 and 84. The circuit 54 functions to determine the magnitude of the load and to limit the current flow below a preset level. For example, if a short line connection (low resistance) is made, the current flow through the resistors 66 and 76 is in a direction to render the transistor less conductive compared to a long line connection, thereby controlling the amount of current flow to the load. On the other hand, if a long line (high resistance) connection is made, the current flow through the resistors 66 and 76 will be reduced as compared to that of the short line, thereby increasing the forward bias of the transistor as compared to the short line connection. Hence, it can be seen that the potential across the series circuit including the resistor 66 and the collector and emitter of the transistor 64 is an inverse function of the resistance of the line connected thereto.

The circuit 86 is connected to the current limiting circuit 54 to monitor the potential drop across the series combination of the resistor 66 and the collector and emitter of the transistor 64. The detector circuit 86 includes a transistor 88. The emitter lead of the transistor 88 is connected through a resistor 90 to the negative terminal of the battery 50 and through a zener diode 92 to ground. The zener diode 92 provides a constant biasing potential at the emitter of the transistor 88. Forward biasing of transistor 88 is provided through both a resistor 94 connected between the base and the emitter of transistor 88 and a resistor 96 connected in series with a diode 97 between the base of the transistor 88 and the collector of transistor 64. A resistor 99 is connected between the collector of the transistor 88 and the negative terminal of the battery 50.

The detector circuit 86 monitors the potential across the series circuit including the resistor 66 and the collector and emitter of the transistor 64. Since the aforesaid potential is an inverse function of the resistance of the particular telephone line (62a–62n) connected to the current limiting circuit 54, the magnitude of the current flow through the transistor 88 is also an inverse function of the resistance of the same particular telephone line connected to the circuit 54. Consequently, the potential at the junction 101 can be utilized to perform functions to compensate for different resistances encountered when the plurality of telephone lines 62a–62n are individually selected for connection to the switching equipment 58. The operation of the current limiting circuit 54 and detector circuit 86 is explained in further detail in a copending U.S. Pat. application, Ser. No. 185,180, entitled "Current Limiting And Resistance Monitoring Circuit," filed on Sept. 30, 1971, for William E. Shaffer.

The resistance of a telephone line is a function of the diameter of the conductor, the resistivity of the material employed and the length of the line. The attenuation of a given conductor size is a function of the resistance of the line and therefore proportional to its length. It would be desirable if such suitable means, as a repeater, was connected into the line to provide AC signal amplification to within a desirable range. This is achieved by the present invention by connecting a switching circuit 100 such, for example, as a relay through a threshold circuit 102 such, for example, as well known voltage comparator circuits or Schmidt Trigger Circuits via an isolation amplifier 98 connected to the junction 101 (collector of the transistor 88). Examples of voltage comparator circuits are disclosed on pages 458–484 in a book entitled "Pulse and Digital Circuits," by Jacob Millman and Herbert Taub, 1956 edition. The threshold circuit 102 is turned "on" at a predetermined magnitude of the potential at junction 101. The threshold circuit 102 remains "on" until the magnitude of the potential junction 101 reaches a turn off level and positively turns the switching circuit 100 "off." A dead band can be included in the threshold circuit so that the "turn on" level is different than the "turn off" level.

When the threshold circuit is turned "on," the switching circuit 100 is actuated to connect a repeater 104 via contacts 100A–100F into the transmission path between leads 82 and 84 and 105 and 107, thereby amplifying the signals transmitted in the connection including one of the telephone lines 62a–62n. When the repeater 104 is not used, it is bypassed by the normally closed contacts 100C and 100F. Power is removed from the repeater 104 when not used by contacts 100G. The repeater circuit can be the well known negative impedance repeater circuit, or a hybrid repeater circuit. Although the repeater circuit is shown connected in shunt with lines 82 and 84, it could also be connected in series with the lines 82 and 84 depending upon the portion of the system in which the repeater is to be connected.

As a further embodiment, a lead 106 is connected between junction 101 and the repeater 104 via a gain control circuit 109. The lead 106 provides a signal for automatically adjusting the gain of the repeater 104. The potential at junction 101 is a function of the resistance of the telephone line connected to the circuit by the switching equipment 58. The repeater 104 instead of having a fixed magnitude of amplification based on the average resistance of all the telephone lines is now capable of providing a variable magnitude of amplification as a function of the line resistance.

Figure 3:
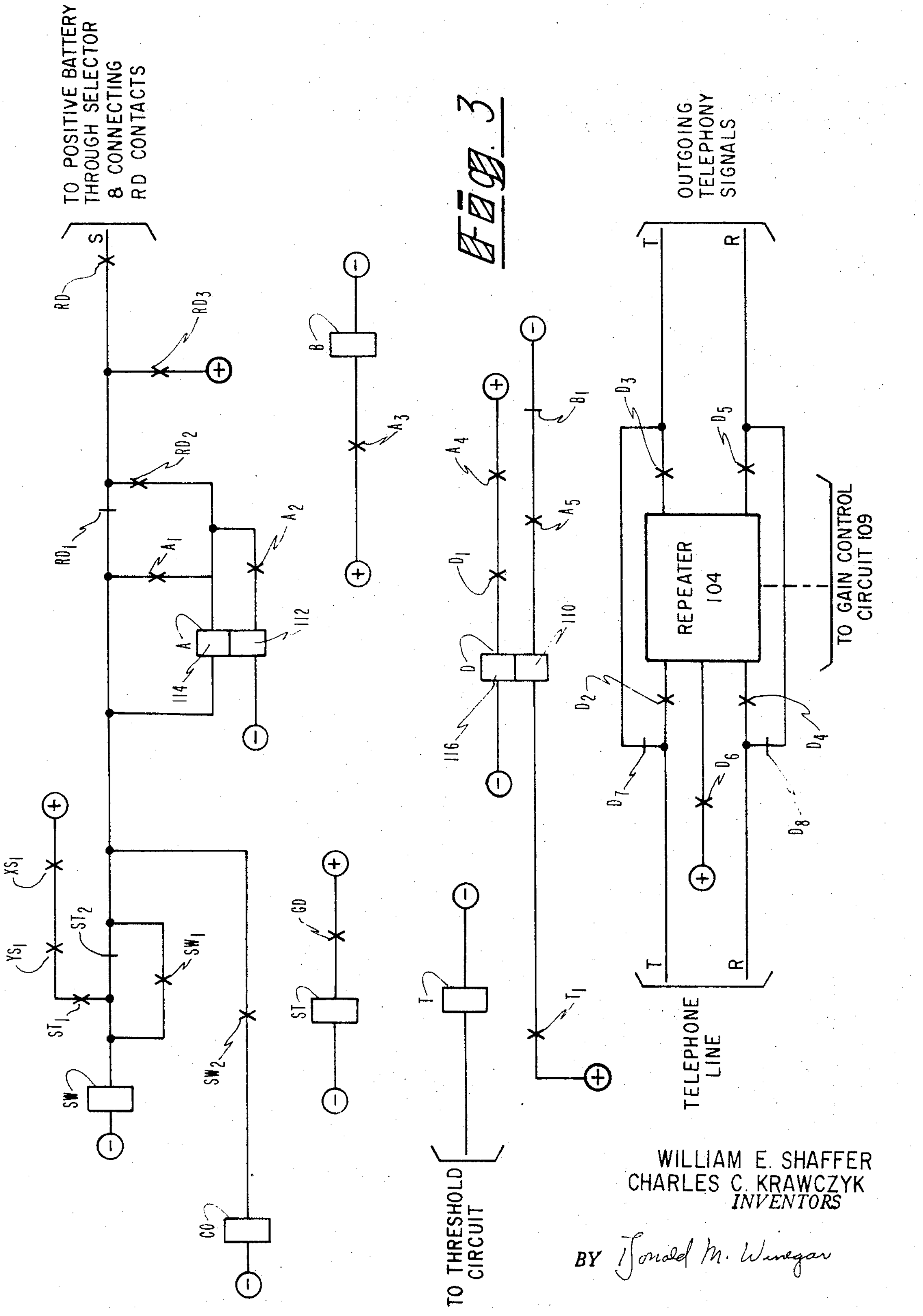
FIG. 3 is a schematic diagram of the calling party repeater connect circuit of FIG. 1.

Referring now to FIG. 3 (calling party repeater connect circuit 23), when a subscriber goes "off hook," in one of the telephone sets 60*a*–60*n* (FIG. 2), a line relay (not shown) in the line circuit is picked up. The operated line relay signals the allotter circuit 13 (FIG. 1) to assign a line finder for locating the telephone line 62*a*–62*n* requesting service. A guard relay (not shown in the allotter circuit is operated closing the contacts GD, thereby operating the start relay (ST). Other contacts (not shown) of the guard relay close to busy the seized line finder.

Start relay ST, when picked up, preseizes the first selector 18 (FIG. 1), acutates the $ST_1$ and $ST_2$ contacts connected to the switch through relay (SW) circuit. Additionally, other contacts (not shown) of the relay ST connect a shunt load across the tip and ring leads 82 and 84 actuating the relay 56 (FIG. 2), which, in this instance, is a calling battery feed relay (CB) in the first selector associated with the seized line finder. The actuated calling battery feed relay operates the relay RD (not shown) in the assocaited first selector. Operation of the relay RD places a ground on the back sleeve lead S of the selector circuit to the coail of relay A, but relay A does not operate at this time since contacts $ST_2$ and $SW_1$ are open. When the line finder switch finds the X level of the line requesting service, the X stop ($X_s$) relay in the allotter operates to stop the hunting of the switch in the X direction and transfers the switch to hunt in the Y direction and actuates the $X_{s1}$ contacts. The switch now hunts in the Y direction until the line requesting service is found and the Y stop ($Y_s$) relay in the allotter operates to stop further hunting of the switch and actuates the $Y_{s1}$ contacts. With relays ST, $X_s$ and $Y_s$ operated, positive battery is applied to relay SW via contacts $X_{s1}$, $Y_{s1}$ and ST. and relay SW operates. Relay SW, when operated, closes the contacts $SW_1$ and $SW_2$ to bypass the open contacts $ST_2$ and to pick up the relay CO, and also connects the relay SW to the positive battery impressed on the back sleeve S by the relay RD (not shown) of the first selector switch. Relay A is still not operated at this time since positive battery potential is present on both sides of the coil 114. The operation of relay $Y_s$ also opens the path to the relay GD and the relay GD starts to release. Relay GD, when released, opens the path to the relay ST and relay ST starts to release. Relay ST upon being released, removes the shunt load from the lines 82 and 84. In addition, the release of relay GD releases the relays $X_s$ and $Y_s$. The positive battery which caused the relay SW to pick up is now removed, but relay SW remains picked up by the positive battery impressed upon the back sleeve S via the coil 114 of the relay A, which is now picked up. The operate time of the relay A is greater than the release time of the relay ST.

When operated, the relay A closes contacts $A_1$ through $A_5$. The contacts $A_2$ are preliminary make contacts which close before the remaining contacts of relay A, thereby locking the relay A to the sleeve lead through coil 112 of the relay A. The contacts $A_1$ provide a shunt circuit around the coil 114 of the relay A to minimize the sleeve lead impedance.

The potential at the collector lead of the transistor 66 in the current limiting circuit 54 is now adjusted in accordance with the resistance of the telephone line requesting service (rather than the shunt load). The detector circuit 86 monitors the potential across the resistor 66 and the transistor 64 and a signal which is a function of the resistance of the connected telephone line is present at junction 101. Should the connected telephone line exhibit a sufficient resistance to signify it is a line requiring a repeater, the threshold circuit 102 is actuated. The threshold circuit 102, in turn, actuates the switching circuit 100 operating a relay T (FIG. 3) which is a component thereof. The relay T, when operated, closes contacts $T_1$ and positive potential is applied to the coil 110 of the relay D.

The closec contacts $A_3$ and $A_5$ complete the circuit to the relay B and to the coil 110 of the relay D, respectively. However, relay B has an operating time which is greater than the operating time of relay D. Relay D is picked up through its coil 110 since contacts $T_1$ are closed (when a long line is connected). Relay D now closes contacts $D_1$ through $D_6$ and opens contacts $D_7$ and $D_8$ connecting the repeater 104 into the telephone connection. Contacts $D_1$ are preliminary make contacts and when closed, lock up relay D through the second coil 116 of relay D. The closing of contacts $D_6$ energizes the repeater 104. If required, the output signal of the gain control circuit 109 may also be connected to the repeater 104 to provide an automatic gain signal for the repeater 104.

After the relay D picks up (if the relay T was operated), relay B is picked up and opens the contacts B preventing any further energization of coil 110 of the relay D. The relay D remains picked up through closed contacts $D_1$ and $A_4$.

If the resistance of the connected telephone line is insufficient to require a repeater, the signal at the junction 101 (FIG. 2) is of insufficient magnitude to actuate the threshold circuit 102 and relay T (FIG. 3 would not be picked up. If the relay T is not picked up, the contacts $T_1$ would remain open and when the relay A is picked up, the relay D would not operate before the relay B operates.

Figure 4:
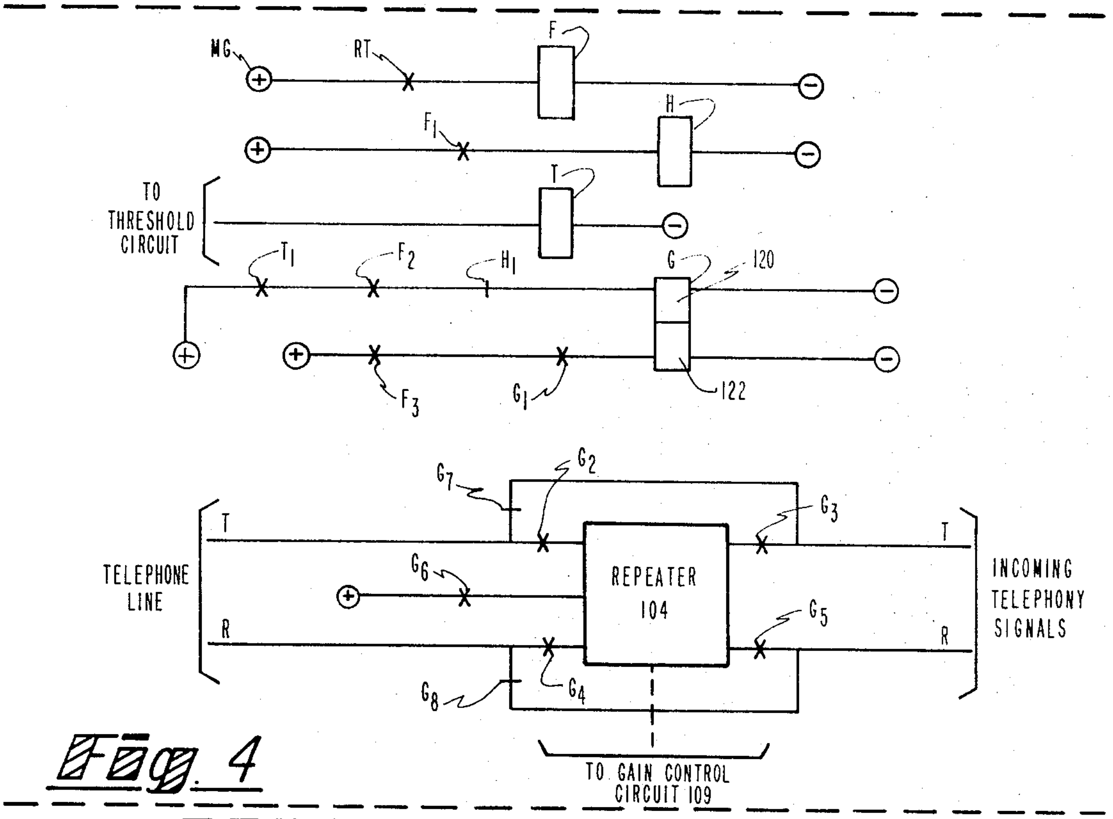
FIG. 4 is a schematic diagram of the called party repeater connect circuit of FIG. 1.

Referring now to FIG. 4 (called party repeater connect circuit 25), in answer to a ringing signal, a called subscriber goes "off hook" connecting its associated telephone line through the switching equipment 58 (FIG. 2) to energize a ring-trip (RT) relay (not shown). The relay RT, picked up, discontinues the ringing signal, connects the answer battery relay 56 (FIG. 2) into the circuit and closes contacts RT, thereby operating relay F. Meanwhile, the called telephone set having gone off hook has operated the current limiting circuit 54 and the detector circuit 86. A signal which is a function of the resistance of the telephone connection is present at junction 101. Should the signal indicate that a repeater is required in the telephone line of the called party, threshold circuit 102 operates and energizes the switching circuit 100 and the relay T operates closing contacts $T_1$.

Relay F closes contacts $F_1$ through $F_3$. Relays H and G are energized, but relay H has a longer operating time than relay G. Relay G is picked up first and actuates contacts $G_1$ through $G_8$. Contacts $G_1$ are preliminary make contacts and locks relay G up through contacts $F_3$. Relay G energizes the repeater 104 through closed contacts $G_6$, connects the repeater 104 to the telephone loop circuit through closed contacts $G_2$ through $G_5$ and removes the bypass circuits about the repeater 104 by opening contacts $G_7$ and $G_8$. Relay H now opens contacts $H_1$ removing the ground from coil 120. Relay G remains picked up through coil 122 and contacts $G_1$ and $F_3$. The repeater 104 will remain in the circuit until the telephone connection is broken and relay F drops out. The foregoing arrangement provides a delay circuit for disabling the control circuit from responding to the control signal via the T1 contacts after a preset period of time following the telephone connection to the exchange so that, for instance, the control circuit is made insensitive to dial pulses, which is particularly important on short telephone lines which would not require any amplification whatsoever. Meanwhile, both the current limiting circuit 54 and the detector circuit 86 remain connected to the telephone line. The detector circuit 86 continues monitoring the resistance of the telephone line and impresses a signal on junction 101 which is a function of the resistance of the telephone line. Therefore, the signal AGC lead 106 can be used to continually adjust the operation of the repeater 104 in accordance with this resistance in the connected telephone line.

Figure 5:
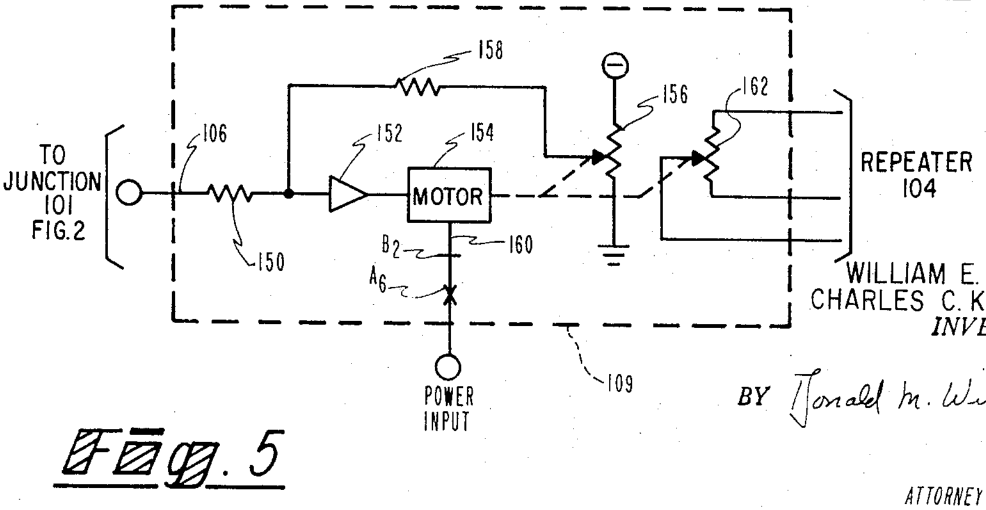
FIG. 5 is a schematic diagram illustrating an automatic gain control circuit having a servo type memory.

The circuits 54 and 86 (FIG. 2) in the loop current and repeater control circuit 20 (FIG. 1) being connected to the first selector circuit are disconnected from the telephone line after the first dial signal. The repeater 104 when once connected into the telephone connection, remains connected thereto until the telephone connection between the parties is broken. However, the AGC signal is no longer present when the calling battery relay in the first selector circuit is disconnected. Some sort of memory is needed if the AGC signal is to be used in the repeater in the first selector circuit. Examples of a memory arrangement is described as a servo system in FIG. 5, or a threshold circuit of FIG. 6, although it is to be understood that other types of memory arrangements can apply.

Connected between the junction 101 and the repeater 104 is a gain or impedance control circuit 109 (FIG. 2) including a servo system (FIG. 5) which includes a summing resistor 150, a high gain amplifier 152, a servo motor 154, and a feedback potentimeter 156. A feedback resistor 158 is connected between the potentimeter 156 and the input of the amplifier 152 to provide a negative feedback signal to control the potentimeter 162 and the gain of the repeater circuit connected through the telephone connection.

The servo motor 154 is connected to a power source by a lead 160 through contacts $B_2$ and $A_6$ for the first selector circuit (or contacts of relays F and H of the connector circuit). The servo motor is coupled to drive the feedback potentiameter 156 and the control potentimeter 162. Power to drive the motor 154 is turned on when relay A is picked up and closes contact $A_6$. The gain control potentimeter 162 is adjusted as a function of the signal on the line 106, until relay B picks up removing the power input to the servo motor. The gain at which the repeater 104 was last set prior to relay B picking up is the level of gain at which the repeater 104 will remain.

Figure 6:
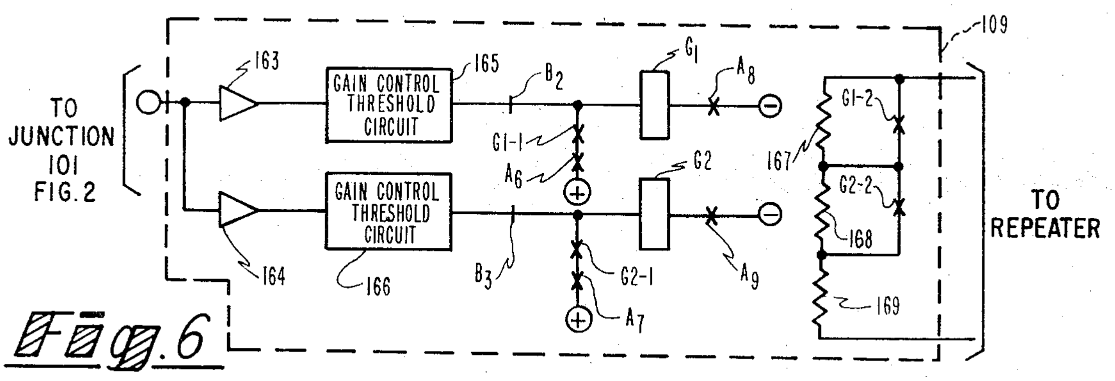
FIG. 6 is a diagram illustrating a second embodiment of an automatic gain control circuit having a threshold circuit type memory.

The circuit of FIG. 6 provides an automatic gain control signal in a step-wise fashion in accordance with preset values in telephone line resistance. In FIG. 6, the junction 101 (FIG. 2) is connected via a pair of isolation amplifiers 163 and 164 to the gain control threshold circuits 165 and 166, respectively. The gain control threshold circuits 165 and 166 can also be Schmidt Trigger Circuits that are actuated, when a preset level of signal is reached, to provide an output signal. The threshold level of the threshold circuit 165 is selected to be operated before the threshold circuit 166.

The output of the threshold circuit 165 is connected through the normally closed contacts $B_2$ (of relay B, FIG. 3) to one side of a coil of relay G1, while the other side of the relay coil is connected through the normally open contacts $A_8$ (of relay A, FIG. 3) to a power supply terminal. The coil of relay G1 is also connected to the positive potential via contacts G1-1 and $A_6$. In the same manner, the output of the threshold circuit 166 is connected through the normally closed contacts $B_3$ to one side of a coil of the relay G2, while the other side of the coil is connected to a power terminal through the contacts $A_9$. The coil of relay G2 is also connected to the positive potential through the contacts G2-1 and $A_7$. A series circuit including the resistors 167, 168 and 169 is provided for controlling the gain of the repeater. The normally open contacts G1-2 are connected across the resistor 167 while the normally open contacts G2-2 are connected across the resistor 168. In the case the circuit of FIG. 6 is to be used in the selector circuit, the contacts of relays A and B will be substituted by contacts of relays F and H.

In operation, if the signal at the junction 101 is at a level wherein the threshold circuits 165 and 166 are not actuated, neither of the relays G1 or G2 will be operated and the full resistance of the three resistors 166–169 will be transmitted to the repeater. If the signal at the junction 101 reaches a level wherein the threshold circuit 165 is operated and the threshold circuit 166 is not operated (with relay A operated), the relay G1 will be picked up before the relay B is operated. The relay G1 will remain operated for the duration of the call after relay B is operated via the contacts $A_6$ and G1-1. When the relay G1 operates, the contacts G1-2 close to short out the resistance 167. A lower resistance will now be presented to the repeater to increase its gain. If the signal at junction 101 is of a level to operate both the gain threshold circuits 165 and 166, both the relays G1 and G2 will be operated and "locked in" for the duration of the telephone call wherein the resistors 167 and 168 will be shorted out to provide a signal to the repeater circuit to further increase the gain of the repeater. Hence, it can be seen the gain of the repeater circuit connected to the telephone connection can be preset in predetermined steps as a function of telephone line resistance. Once set, the gain of the repeater in a telephone connection remains constant for the duration of the call. Although FIG. 6 discloses two threshold switching circuits, it is to be understood that any number of such threshold switching circuits (one or more) can be employed depending upon the fineness of control desired.

It should be understood that the circuit of FIG. 1 can be modified so that the first selector circuit 18, when seized, can continuously supply line current to the calling party for the duration of the call. Under this arrangement, a separate bridge circuit will be included between the first selector 18 and the connector circuit 30 (and through the other selector stages 21) to provide for pulsing and signal transmission. With the first selector connected continuously in the circuit, the loop current and repeater control circuit 20 will continuously provide an AGC signal to control the gain of the repeater circuit connected through the telephone connection.

As an alternative, if it is desirable to connect the repeater to both long and short line connections, the circuit of FIG. 2 can be modified to eliminate the threshold circuit 102 and the switching circuit 100, and all its contacts 100A–100F (including the bypass circuits around the repeater 104) so that the repeater is permanently connected in series with the tip and ring lines. Under such an arrangement, the gain or impedance control circuit 107 will function to automatically adjust the gain of the repeater when the relay D of FIG. 3, or relay G of FIG. 4, is actuated in accordance with the resistance of the line in the connection to eliminate the possibility of oscillations and reducing any echo effect.

Figure 7:
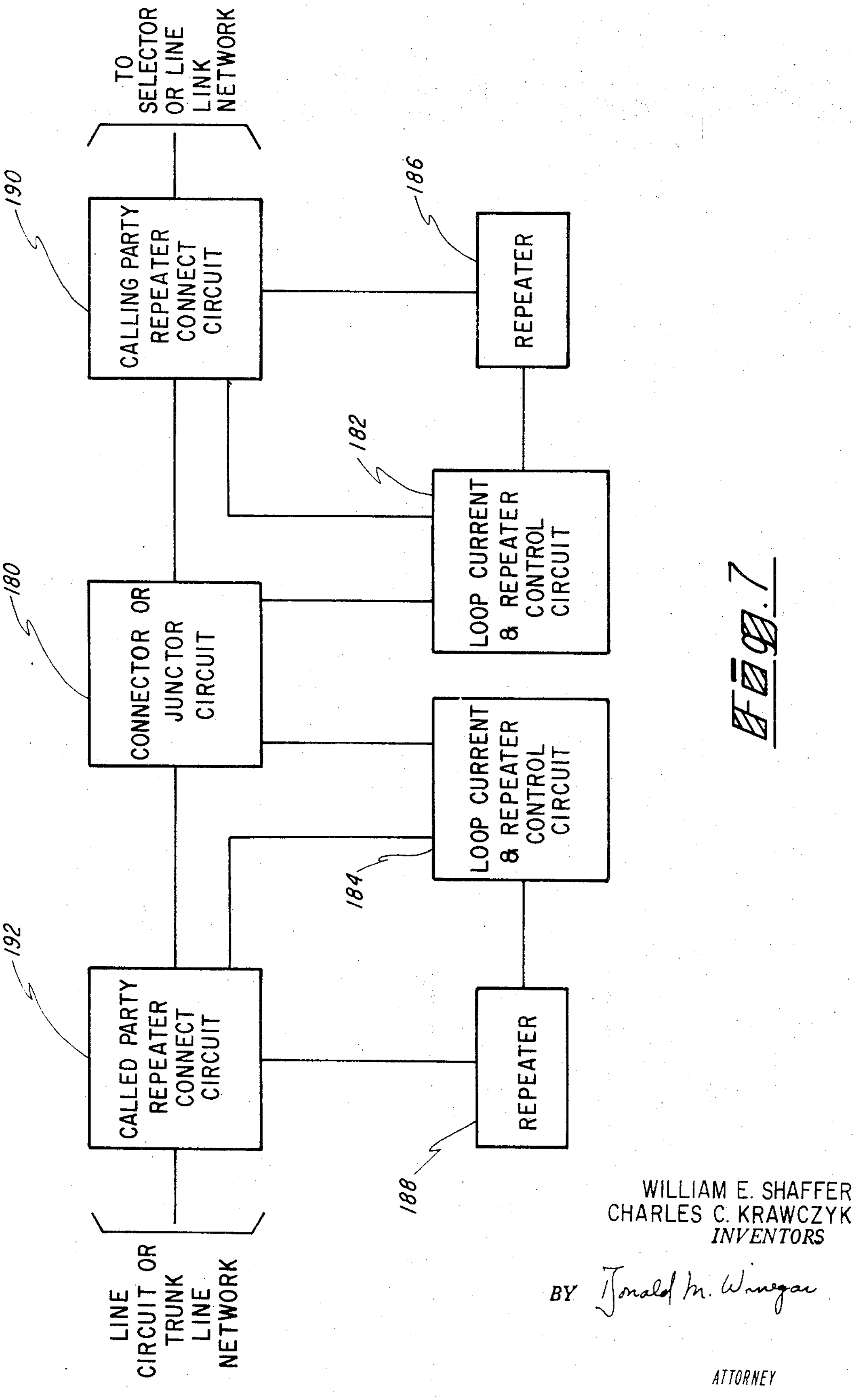
FIG. 7 is a block diagram of a second embodiment of a system wherein the amplifier select and control circuit of the invention is connected to a connector circuit in a step-by-step system or a junctor or trunk circuit in a common control system.

The embodiment of FIG. 7 includes an arrangement wherein a pair of loop current and repeater control circuits 182 and 184 of the invention are used to provide current limiting for long and short line connections and for selectively inserting repeaters into the connections, in a connector circuit of a step-by-step system, or a junctor circuit in a common control system. It is well known that the connector circuit in a step-by-step system, after a connection between the calling and called parties is established, provides the calling party and the called party with battery power via two separate due coil relays, i.e., the calling battery relay (CB) and the answer battery relay (AGB). In a similar manner, the junctor circuit in common control systems includes the calling battery and answer battery relays for separately providing battery power to the calling party and called party, respectively. A junctor circuit of this type is disclosed in a U.S. Pat. No. 3,487,170 to J.G. Pearce, et al., entitled "Universal Junctor," and also in U.S. Pat. application Ser. No. 100,571, entitled "Junctor and Junctor Control," filed for O. Altenburger, on Dec. 22, 1970.

Figure 8:
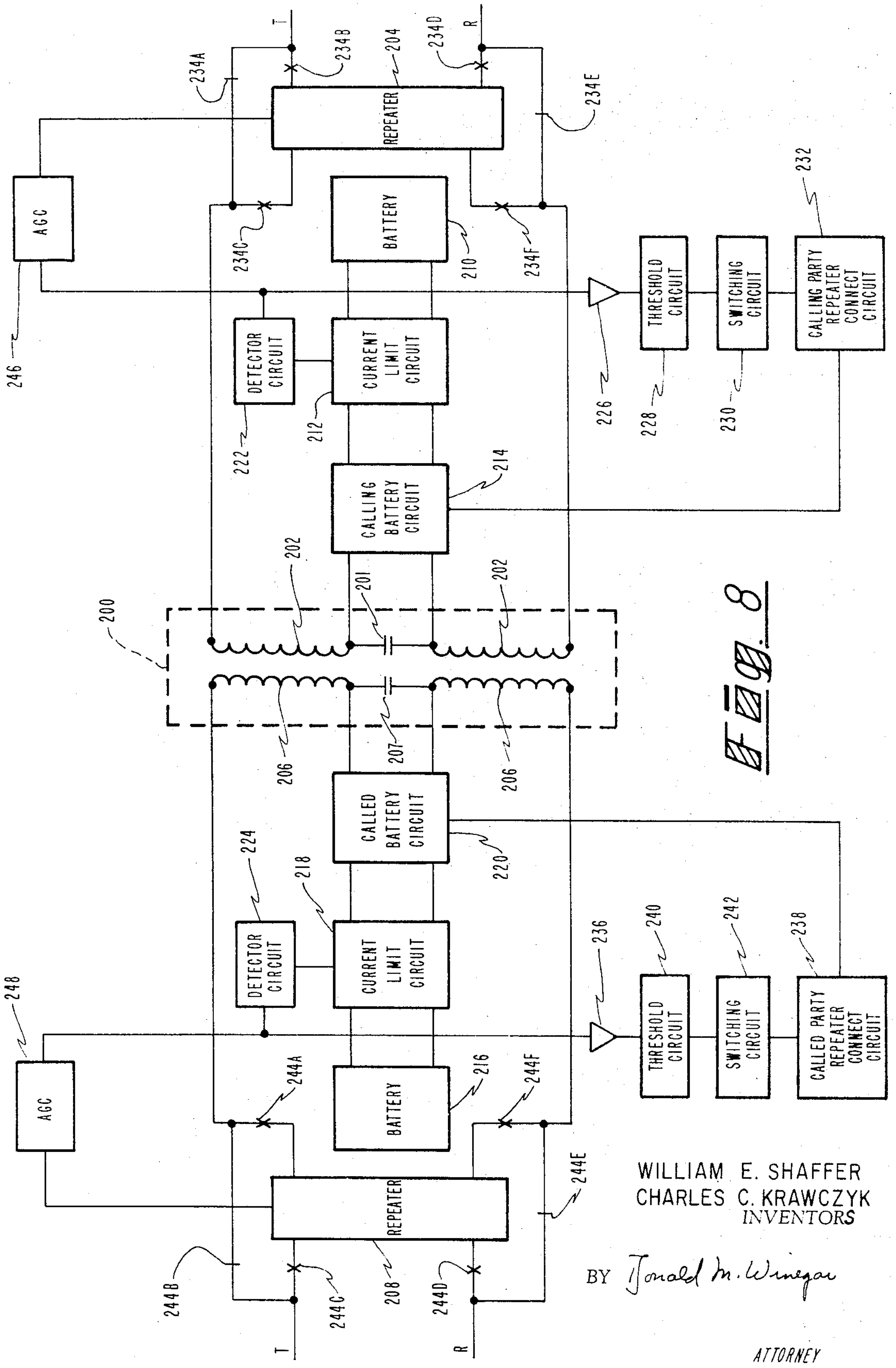
FIG. 8 is an expanded block diagram of the embodiment of FIG. 7 showing further detail, and FIG. 9 includes a two-to-four wire converter arrangement that can be used to modify the arrangement of FIG. 8 to include unidirectional amplifiers rather than bidirectional repeater amplifier circuits.

The two separate loop current and repeater control circuits 182 and 184 are connected to a connector, or junctor, circuit 180. The loop current and repeater control circuits 182 and 184 are provided to monitor the loop length of the calling and called parties, respectively. The connector, or junctor circuit 180 includes a power source and the calling battery (CB) and answer battery (AB) relays. One current limiting circuit is connected in series between the office battery and the calling battery relay and another is connected in series between the office battery and the answer battery relay in a manner as illustrated in FIG. 8. One loop current and repeater control circuit is connected to monitor the current limiting circuit connected in series with the calling battery relay while another is connected to monitor the current limiting circuit connected in series with the answer battery.

Referring again to FIG. 7, separate repeater circuits 186 and 188 are connected to the calling party repeater connect circuit 190 and the called party repeater connect circuit 192, respectively. Separate loop current and repeater control circuits 182 and 184 are connected to control the switching action of repeater connect circuits 190 and 192, respectively. The loop current and repeater control circuits 182 and 184 are also connected to the repeater circuits 186 and 188, respectively, to apply an AGC signal thereto (optional), as previously mentioned. The called party repeater connect circuit 192 is identical to that disclosed in FIG. 4 and is under the control of the loop current and repeater control circuit 184. When used in a common control system, the normally open contacts RT (FIG. 4) of the ring-trip relay can be replaced by the normally open contacts of the answer battery relay. The calling party repeater connect circuit 190 includes a relay D connected through the relay A, B and D contacts, as illustrated in FIG. 4, however, receiving a control signal from the loop current and repeater control circuit 182.

The arrnagment is such that when the ring-trip relay is actuated, or the answer battery relay is operated in the case of a common control circuit, in response to the called party going off hook, the control signals from the loop current and repeater control circuits 182 and 184 switch in the respective repeater circuits depending upon whether long line connections are involved. The repeater circuits will remain in the connection for the duration of a call.

Both of the loop current and repeater control circuits 182 and 184 are connected to the connector, or junctor circuit 180 in a manner to generate a continuous AGC signal. If desired, the motor driven AGC servo system of FIG. 5 or the relay switching circuit of FIG. 7 can be included.

It should be understood, of course, that in systems wherein trunk circuits provide the answer battery to the called party for calls initiated from another exchange, a loop current and repeater control circuit, a repeater circuit, and a repeater connect circuit can be included in the trunk circuits as set forth above with regards to the connector circuit of FIGS. 1, 2 and 4.

In the expanded block diagram of FIG. 8, the connector or junctor circuit 180 of FIG. 7 is illustrated as including a standard transformer bridge circuit 200. The windings 202 of the bridge circuit 200 are connected to the tip and ring lines extending to the calling party either directly, or via a repeater 204 when a long line connection is involved. The windings 206 are connected to the tip and ring line extending to the called party either directly or through a repeater 208. Current from a battery 210 is applied to the windings 202 via a current limiting circuit 212 (such as circuit 54 of FIG. 2) and a calling battery circuit 214. In a similar manner, current is supplied from the battery 216 via a current limiting circuit 218 and a called battery circuit 220. The calling battery circuits 214 and 220 can include the calling battery relay (CB) and answer battery relay AB (relay 56) as disclosed in FIG. 2, or magnetic core sensing circuits, such as disclosed in the copending U.S. Pat. application, entitled "Junctor and Junctor Control," Ser. No. 100,571.

Detector circuits 222 and 224 (such as the circuit 86 in FIG. 2) are connected to the current limiting circuits 212 and 218, respectively, for providing a control signal that is a function of the resistance of the telephone circuit connected thereto as previously described with regards to FIG. 2. The detector circuit 222 is connected via an amplifier 226 and a threshold circuit 228 to a switching circuit 230 to apply a switching signal to a calling party repeater connect circuit 232 when the resistance of the connection exceeds a preset limit. The calling party battery circuit 214 is connected to the calling party repeater connect circuit 232 to signal the connect circuit 232 that the battery connection to the calling party has been completed, and can, for example, energize relay F of the circuit of FIG. 4 to connect the repeater 204 into the circuit by actuating the contacts 234A–234F. At the same time, the repeater 204 is also energized. In a similar manner, the output of the detector circuit 224 of the called party is connected to a called party repeater connect circuit 238 via an amplifier 236 and a threshold circuit 240 and a switching circuit 242 to apply a switching signal to the connect circuit 238 whenever the resistance of the telephone connection exceeds a preset level. The called party repeater connect circuit 238 (like the calling party repeater connect circuit 232), receives a signal from the called battery circuit 220 indicating the connection is complete so that the repeater 208 can be connected into the telephone connection by actuating contacts 244A–244F. At the same time, the repeater 208 is energized. The AGC circuits 246 and 248 are connected to the detector circuits 222 and 224, respectively, to control the gain of the repeaters 204 and 208, respectively. The AGC circuits 246 and 248 can also include a memory type arrangement as disclosed in FIGS. 5 and 6.

Figure 9:
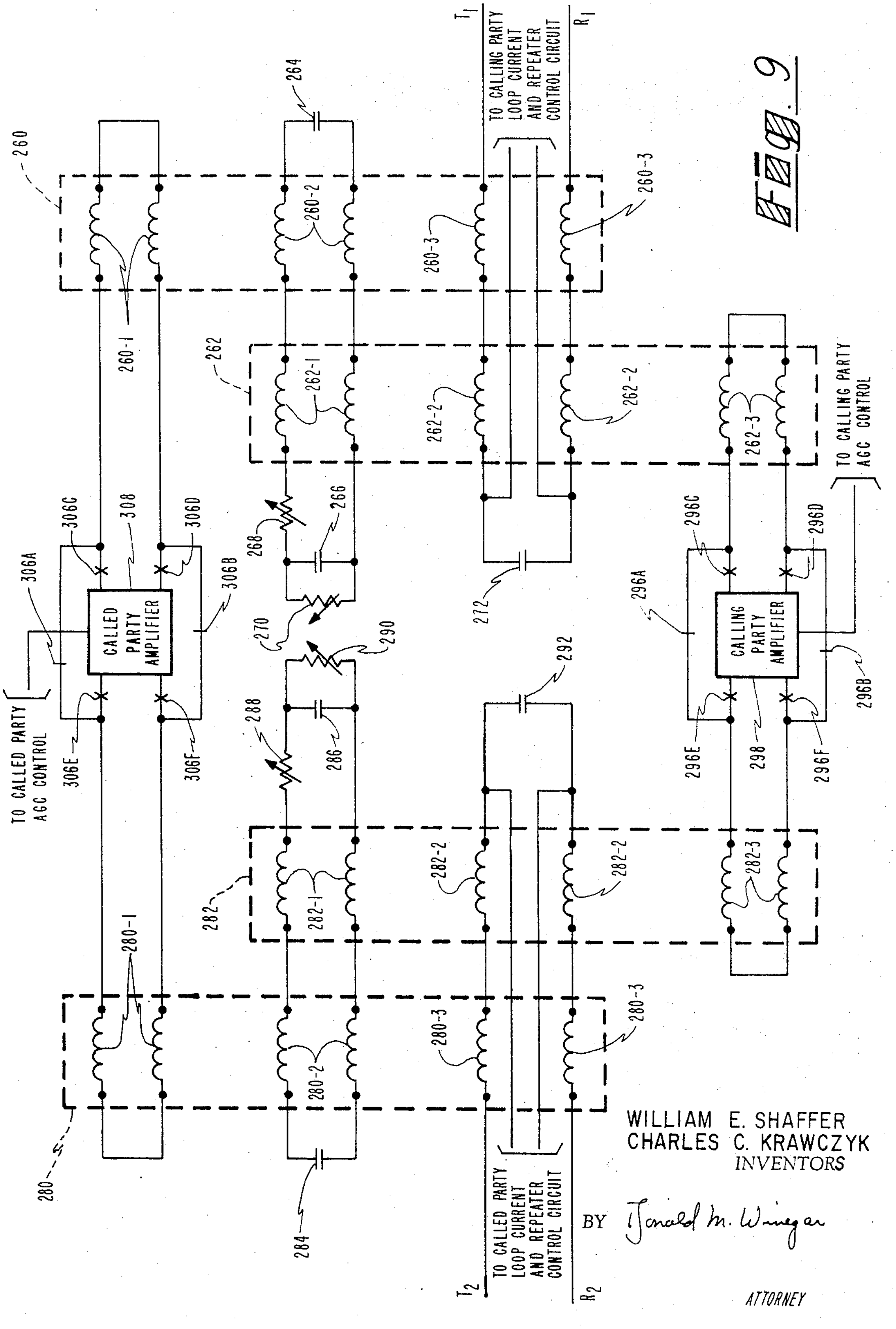

FIG. 9 includes a pair of two-to-four wire hybrid circuits interconnected back-to-back to provide an arrangement wherein unidirectional amplifier circuits, rather than bidirectional amplifiers or repeaters can be inserted in the system of FIGS. 1, 2, 3, 4, 7 and 8 to provide added gain for voice signal losses. The terminals T1 and R1 correspond to the tip and ring leads extending through the switching equipment to the calling party while terminals T2 and R2 correspond to the tip and ring leads extending to the called party. The calling party hybrid circuit includes a first transformer 260 having three pairs of windings 260-1, 260-2 and 260-3, and a second transformer 262 having three pairs of windings 262-1, 262-2 and 262-3. The windings 260-2 and 262-1 are connected in series with capacitors 264 and 266 and resistors 268 and 270 for balancing the operation of the hybrid circuit. The windings 260-3 and 262-2 are connected in series with a capacitor 272. The loop current and amplifier control circuit is connected across the capacitor 272 in a manner as connected across the capacitor 201 in FIG. 8. The called party hybrid circuit includes a first transformer 280 having three pairs of windings 280-1 and 280-3, and a second transformer 282 having three pairs of windings 282-1, 282-2 and 282-3. The windings 280-2 and 282-1 are connected in series with capacitors 284 and 286 and resistors 288 and 290 for balancing the operation of the hybrid circuit. The windings 280-3 and 282-2 are connected in series with a capacitor 292. The loop current and amplifier control circuit is connected across the capacitor 292 in a manner as connected across the capacitor 207 in FIG. 8.

The windings 262-3 from the calling party hybrid circuit are connected via normally closed contacts 296A and 296B to the windings 282-3 of the called party hybrid circuit to provide signal translation from the calling party to the called party. Whenever the calling party loop current and repeater control circuit connected to the capacitor272 detects a high resistance connection, the contacts 296A–296F are actuated to connect a calling party amplifier circuit 298 into the connection for amplifying the signals transmitted from the calling party to the called party. The calling party amplifier 298 is also connected to the AGC control circuit corresponding to the calling party line to control the gain of the amplifier 298 as a function of the resistance of the connection.

The windings 280-1 from the called party hybrid circuit are connected via normally closed contacts 306A and 306B to the windings 260-1 of the calling party hybrid circuit to provide signal translation from the called party to the calling party. Whenever the loop current and repeater control circuit connected to the capacitor 292 detects a high resistance connection, the contacts 306A–306F are actuated to connect a called party amplifier circuit 308 into the connection for amplifying the signals transmitted from the called party to the calling party. The called party amplifier 308 is also connected to the AGC control circuit corresponding to the called party line to control the gain of the amplifier as a function of the resistance of the connection.

What is claimed is:

1. An amplifier select and control circuit for telephone systems including switching equipment having a plurality of like circuits for making telephone connections to telephone sets via various telephone lines having different line resistances comprising:

at least one amplifier means associated with one of the like circuits;

first circuit means for providing a control signal that is a function of the resistance of a telephone connection to a telephone set through the like circuit associated with said amplifier means and for generating a switching signal when the resistance exceeds a preset level;

second circuit means responsive to said switching signal for connecting said amplifier means into the telephone connection for the duration of the telephone call, and a gain control circuit responsive to said control signal for controlling the gain of said amplifier means including memory means for providing a gain control signal to said amplifier means that is a function of the control signal when the telephone connection is initially established.

2. An amplifier select and control circuit as defined in claim 1 wherein said memory means includes:

a servo circuit responsive to said control signal for adjusting a resistance circuit as a function of the level of the control signal.

3. The amplifier select and control circuit as defined in claim 1 wherein said memory means includes:

at least one threshold circuit connected to receive the control signal for activation thereof when the control signal reaches a preset level, and switching means connected to said threshold circuit for changing the gain of the repeater circuit when the threshold circuit is activated.

4. An amplifier select and control circuit for telephone systems including switching equipment having a plurality of like circuits for making telephone connections between various telephone sets via separate telephone lines having different line resistances comprising:

at least one amplifier means associated with one of the like circuits;

first circuit means for providing a control signal which is a function of the resistance of a telephone connection through the like circuit associated with said amplifier means;

second circuit means for determining when said control signal reaches a preset level for connecting said amplifier means into said telephone connection, and a gain control circuit connected between said first circuit means and said amplifier means responsive to said control signal for controlling the gain of said amplifier means including memory means for providing a gain control signal to said amplifier means that is a function of the level of the control signal when the telephone connection is initially established.

5. An amplifier control circuit for telephone systems including switching equipment for making telephone connections to telephone sets via various telephone lines having different line resistances and an amplifying circuit permanently connected into each of said various telephone connections comprising:

first circuit means for providing a control signal which is a function of the resistance of a telephone connection, and a gain control circuit connected between said first circuit means and said amplifying circuit responsive to said control signal for controlling the gain of the amplifying circuit as a function of the resistance of the telephone connection including memory means for providing a gain control signal to the amplifying circuit that is a function of the level of the control signal when the telephone connection is initially established.

6. In telephone equipment for making telephone connections between telephone circuits, wherein the telephone circuits are connected to the telephone equipment via separate telephone lines and wherein the telephone equipment supplies power from a DC power source via separate switching circuits to at least one of the telephone circuits in each telephone connection, a repeater connect circuit comprising:

a plurality of circuit means, at least a separate one for each of the telephone connections, wherein separate circuit means are connected in series between the power source and separate switching circuits for providing at least one control signal for each telephone connection having a level that is a function of the resistance of the connection to at least one of the telephone circuits in each telephone connection;

a plurality of repeater circuits, a separate one for each of said plurality of circuit means;

a plurality of control circuit means, at least one for each of said circuit means, said control circuit means being responsive to said control signal from a corresponding circuit means and the completion of a connection to at least one telephone circuit for connecting a repeater circuit into the telephone connection when the resistance of the connection through the corresponding switching circuit to said at least one telephone circuit exceeds a preset level, said control circuit means including an inhibit circuit for disabling the control circuit means from responding to the control signal after a preset period of time after the connection to said at least one telephone circuit, and a plurality of gain control circuit means, a separate one for at least one of each of said circuit means in each telephone connection for controlling the gain of a corresponding repeater circuit including a memory circuit that provides a substantially constant gain control signal that is a function of the level of the control signal when a telephone connection is initially completed.

7. In telephone equipment including a line finder stage, a plurality of selector stages, and a connector stage for completing connections between telephone circuits connected to the telephone equipment, a repeater control circuit arrangement comprising:

a plurality of repeater circuits, one for each selector circuit in the first selector stage and one for each connector circuit in the connector stage;

circuit means for each selector circuit in the first selector stage for determining the resistance of a telephone line connected thereto for connecting the associated repeater circuit into the telephone connection when the resistance of the line exceeds a preset level, the repeater when connected being locked in the connection for the duration of the connection, said circuit means, including automatic gain control means for controlling the gain of the repeater circuit as a function of the resistance of the line, and circuit means for each connector circuit in the connector stage for determining the resistance of a telephone line connected thereto for connecting the associated repeater circuit into the telephone connection when the resistance of the line exceeds a preset level, the repeater when connected being locked in the connection for the duration of the connection, said circuit means including automatic gain control means for controlling the gain of the repeater circuit as a function of the resistance of the line.

8. A repeater control circuit arrangement as defined in claim 1 wherein:

said automatic gain control means in said first selector stage includes a memory circuit for providing a substantially constant automatic gain control signal to its connected repeater circuit having a magnitude that is a function of the resistance of the line when initially connected thereto.

9. In step-by-step telephone equipment including a line finder stage, a plurality of selector stages and a connector stage for completing connections to telephone sets connected to the telephone equipment by separate telephone lines, a repeater control system comprising:

a plurality of circuit means connected to separate ones of the selector circuits in the first selector stage wherein each circuit means develops a control signal having a level that is a function of the resistance of a connection established between individual telephone sets and separate selector circuits;

a plurality of repeater circuits, a separate one for each of said first selector circuits;

switching circuit means for each of said first selector circuits responsive to the control signal from the corresponding circuit means for connecting a repeater circuit into the connection for the duration of the connection when the control signal reaches a preset level, said switching circuit means being enabled for connecting the repeater circuit when the connected telephone set goes off hook and prior to the receipt of dial signals and being inhibited from responding to the control signal thereafter;

a plurality of circuit means connected to separate ones of said connector circuits in the connector stage wherein each circuit means develops a control signal having a level that is a function of the resistance of a connection established between individual telephone sets and separate connector circuits;

a plurality of repeater circuit means, a separate one for each of the connector circuits, and switching circuit means for each of the connector circuits responsive to said control signal for connecting a repeater circuit means into the connection for the duration of the connection when the control signal reaches a preset level, said switching circuit means being enabled for connecting the repeater circuit when a telephone set is initially connected to the selector circuit and being inhibited from responding to the control signal thereafter.

10. A repeater control circuit as defined in calim 9 including:

automatic gain control circuit means for each of the selector circuits connected to receive the control signal from the corresponding circuit means for controlling the gain of the corresponding selector repeater circuit, and automatic gain control means for each of the connector circuits connected to receive said control signal from the corresponding circuit means for controlling the gain of the corresponding connector repeater circuit as a function of the resistance of the connection thereto.

11. A repeater control circuit as defined in claim 10 wherein:

said selector automatic gain control circuit includes a memory circuit for providing an automatic gain control signal that is a function of the resistance of the connection thereto between the period when the calling party telephone set goes off hook and prior to the first dial signal.

12. In telephone equipment having a first and second plurality of like circuits for making telephone connections between calling and called telephone circuits respectively, wherein the telephone circuits are connected to the telephone equipment via separate telephone lines, and wherein the telephone equipment supplies power from a DC power source to the telephone circuits through opposite portions of bridge circuits, an amplifier select and control circuit comprising:

first and second amplifier circuits, each being associated with an individual first and second like circuit respectively;

first control circuit means connected to one side of a bridge circuit for providing a first control signal having a level that is a function of the resistance of the connection to the calling telephone circuit through the first like circuit associated with said first amplifier circuit;

second control circuit means connected to a second side of said bridge circuit for providing a second control signal having a level that is a function of the resistance of the connection to the called telephone circuit through the second like circuit associated with said second amplifier circuit;

first switching means responsive to said first control signal for connecting the first amplifier circuit to the connection to the calling telephone circuit for the duration of the telephone call when the first control signal reaches a preset level;

second switching means responsive to said second control signal for connecting the second amplifier circuit to the connection to the called telephone circuit for the duration of the telephone call when the second control signal reaches a preset level, and first and second gain control circuit means, said first gain control circuit means being responsive to the level of said first control signal for controlling the gain of said first amplifier circuit, and said second gain control circuit means being responsive to the level of said second control signal for controlling the gain of said second amplifier circuit, each of said first and second gain control circuit means including a memory circuit that provides a substantially constant gain control signal that is a function of the level of said associated control signals when the connection to the associated telephone circuit is initially completed.

* * * * *